United States Patent Office 3,015,875
Patented Jan. 9, 1962

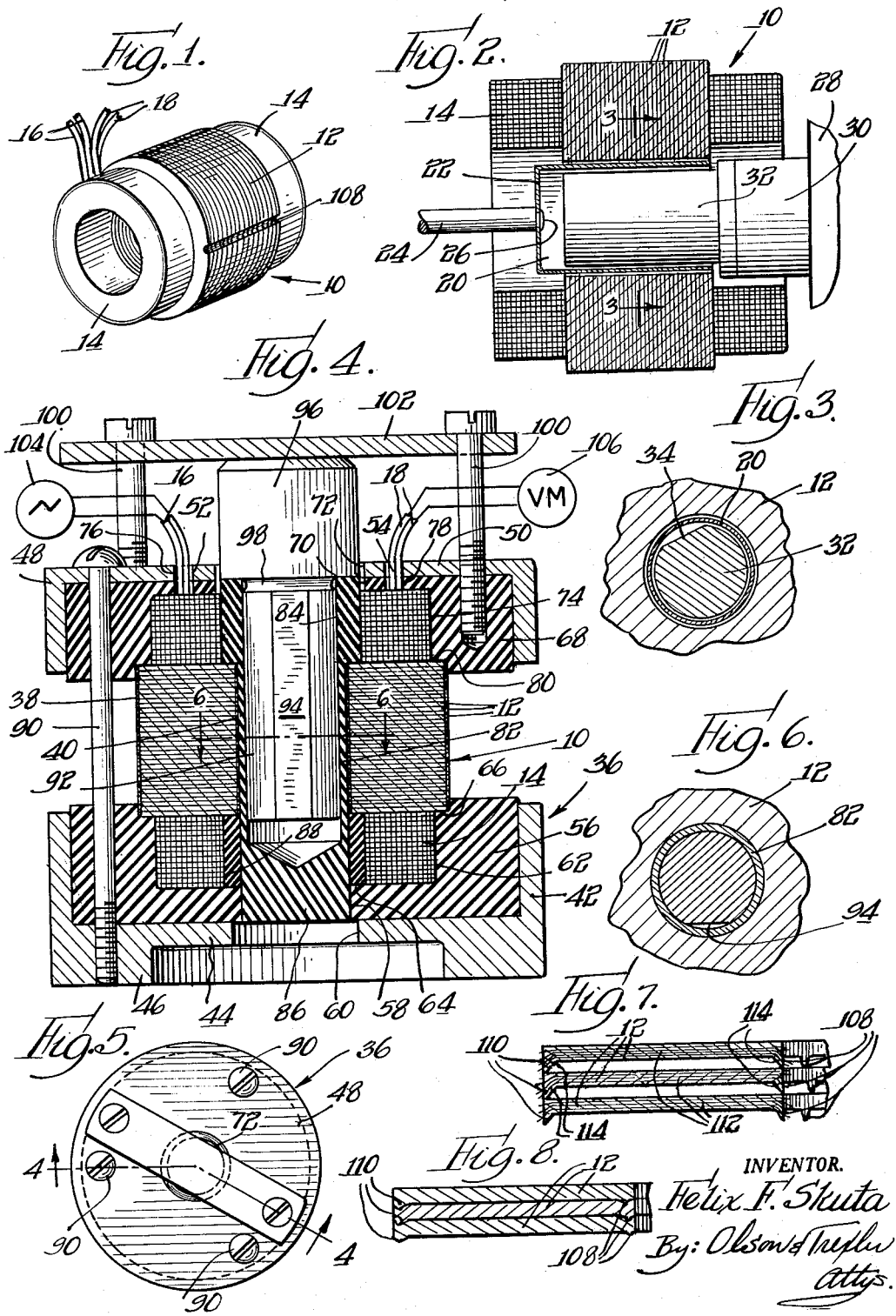

3,015,875
ADJUSTMENT OF TACHOMETER GENERATORS
Felix F. Skuta, Chicago, Ill., assignor to G-M Laboratories Inc., Chicago, Ill., a corporation of Illinois
Filed June 27, 1955, Ser. No. 518,221
6 Claims. (Cl. 29—155.5)

This invention is concerned generally with a tachometer device, and more particularly with an electrical tachometer generator of the drag cup type.

One of the foremost requirements of an electrical tachometer generator is that the output voltage be proportional to speed of rotation. As will be obvious, there should be no output voltage whatsoever when the speed of rotation is zero. However, it heretofore has been difficult or impossible completely to eliminate residual voltage when the tachometer generator is at rest.

In an electrical tachometer generator of the drag cup type, there are provided two windings which are electrically 90° out of phase with one another. The primary or input winding is constantly energized from a suitable source of alternating current voltage at a suitable frequency, for example 400 cycles per second. The secondary or output winding, being at 90° electrically relative to the input winding, normally, and ideally, has no output voltage. A drag cup of non-magnetic conductive material, generally aluminum or sometimes copper, is rotated in the field of the primary winding, both windings generally being wound on a stator resembling that of a small electric motor. The primary or input winding induces currents in the drag cup when the drag cup is rotated, and these induced currents, in turn, induce a voltage in the secondary or output winding, this induced voltage ideally being proportional to the speed of rotation of the drag cup.

Ideally, the two windings of the tachometer generator are 90° out of phase electrically, as heretofore has been noted. However, as a practical matter, it is difficult or impossible to avoid dissymmetries which result in a certain amount of residual voltage giving a spurious reading indicating some speed of revolution when the speed to be measured is zero. It heretofore has been found that much of the residual voltage can be eliminated by placing a slug within the drag cup to complete the magnetic circuit, and by providing a flat on one side of the slug. The input winding of the tachometer generator is energized, and the slug is rotated until a volt meter connected across the output winding registers a minimum. The slug then is fixed in position. It appears that the fundamental component of residual voltage can be pretty well compensated by the dissymmetry in the slug. However, there also are harmonics to the residual voltage, and these apparently cannot be compensated by dissymmetry in the slug.

Accordingly, it is an object of this invention to provide a method of and apparatus for eliminating or minimizing harmonics of residual voltage in a tachometer generator.

Another object of this invention is to provide apparatus for and methods of reducing the residual voltage of a tachometer generator to substantially lower values than ever heretofore obtained.

More specifically, it is an object of this invention to provide apparatus for and methods of symmetrizing the structure of a tachometer generator during manufacture thereof.

Other and further objects and advantages of the present invention will be apparent from the following description when taken in connection with the accompanying drawings, wherein:

FIG. 1 is a perspective view of a tachometer generator stator and windings;

FIG. 2 is a longitudinal sectional view through a tachometer generator, the housing being omitted for clarity of illustration;

FIG. 3 is a cross sectional view substantially along the line 3—3 in FIG. 2;

FIG. 4 is a longitudinal sectional view through a tachometer generator stator and windings as assembled in a fixture or jig forming a part of this invention;

FIG. 5 is a top view of the fixture shown in FIG. 4;

FIG. 6 is a cross sectional view taken along the line 6—6 in FIG. 4;

FIG. 7 is a fragmentary view of a stack of laminations as taken along the line 7—7 in FIG. 1 illustrating one of the factors giving rise to residual voltage; and FIG. 8 is a view similar to FIG. 7 showing how this factor is eliminated in accordance with my invention.

Referring now in greater particularity to the drawings and first to FIGS. 1–3, there will be seen parts of a tachometer generator including a stator assembly 10 comprising a plurality of stamped stator laminations 12 with a pair of windings 14 thereon. The stator laminations 12 are of the type commonly used for small induction motors having inwardly opening windows forming coil gutters receiving the windings 14 as distributed windings. One of the windings 14 is a primary or input winding, as will be understood, and leads 16 are provided therefor. The other winding is a secondary or output winding, as also will be understood, and this second winding is provided with leads 18. The tachometer generator further includes a drag cup 20 which is cylindrical in configuration, being open at one end and closed at the other end as at 22. The drag cup is made of non-magnetic conducting material, preferably aluminum or possibly also copper. The cup is provided with a shaft 24 which is secured to the closed end 22 of the drag cup by means such as a peened over end 26 on an extension of reduced diameter. This shaft 24 also is suitably connected to a device the speed of rotation of which is to be measured, and the coupling may be such as to drive the shaft at the same speed as the measured device, or at a speed proportional thereto.

The complete tachometer generator also is provided with a housing, and this housing generally has been omitted from the drawings inasmuch as it might vary substantially in configuration in accordance with the intended installation of the tachometer generator. The housing does include an end wall or end bell a part of which is indicated at 28, having an inward extension or hub 30 thereon. A magnetic slug 32 is adjustably mounted by the hub 30 and projects into the drag cup 20, forming a rather close fit therewith to complete the magnetic circuit. In accordance with conventional practice, the slug 32 may be either of laminated or solid construction, and is provided along one side with a flat 34 extending longitudinally from one end of the slug to the other. In accordance with the practice heretofore observed, the input or primary winding is energized and a voltmeter is connected across the output or secondary winding. With the drag cup 20 at rest, the slug 32 is rotated about its axis until a minimum voltage is obtained on the volt meter, and the slug then is locked permanently in place. This adjustment might be made by rotating the end piece or end bell 28, or through a rotatable connection between the hub 30 and the end piece or between the hub and slug. This rotational adjustment of the slug is not claimed to be new with this invention, and the specific adjustable mounting of the slug therefore is not deemed necessary to illustrate.

In order further to minimize the residual voltage beyond the best results obtained by the means heretofore discussed, use is made of the jig or fixture identified generally by the numeral 36 and shown in FIGS. 4–6. The windings 14 are wound on the laminations 12 of the stator assembly 10. The stator laminations are not at first secured tightly together, but the outer surface of the stator is brushed with a cementitious compound 38, preferably a thermal setting or polymerizable resin, and the inner bore or diameter of the stator also preferably is coated with this material as at 40. The loosely assembled stator then is assembled with the jig or fixture 36.

The jig or fixture 36 includes a base frame 42 having a cylindrical wall and an end plate 44. The end plate 44 is provided with a thickened rim portion 46 to allow tapping of a bolt thereinto as hereinafter will be set forth. The base frame 42 must be of rigid construction and of non-magnetic properties. Preferably, the base frame is made of brass. The fixture also includes a cap frame 48 generally similar to the base frame 42, having a cylindrical wall and having a top web 50, the web being provided with a pair of spaced holes 52 and 54.

Within the base frame 42 there is mounted a base 56. The base 56 is made of a material to which the cementitious material 38 and 40 will not adhere. The preferred substance for making the base 46 comprises a synthetic plastic, specifically polymerized tetrafluoro ethylene, sold commercially under the name Teflon by the E. I. du Pont de Nemours and Co., Inc. The Teflon base 56 is provided with a central bore 58, the bottom or end wall 44 of the base frame being provided with an aperture 60 aligned therewith and of equal or greater diameter. The Teflon base 56 also is provided with a central recess 62 coacting with the bore 58 to form an external shoulder 64. The Teflon base 56 also is provided with a counterbore coacting with the recess 62 to form a seat 66.

The cap frame 48 holds a cap 68 which is generally similar in construction to the base 56, being made of Teflon and having a central bore 70 aligned with a central bore 72 in the top web 50 of the cap frame 48. The bore 70 is of greater diameter than the bore 58 as hereinafter will be brought out. In addition, the Teflon cap 68 has a central recess 74, and this recess is provided with a pair of holes 76 and 78 respectively aligned with the holes 52 and 54 in the web 50 of the cap frame. The cap 68 also is provided with a counter bore forming a seat 80 slightly above the bottom face of the cap and encircling the recess 74.

The fixture 36 also includes a Teflon sleeve 82 having a thin walled shank portion and a thicker walled head 84. Conveniently the sleeve 82 is closed at 86 at its lower end for rigidity. A Teflon ring 88 detachably fits about the Teflon sleeve 82 generally near the lower end thereof.

Means is provided to hold the foregoing parts together, and also to clamp them toward one another. This means preferably takes the form of a plurality of equally arcuately spaced bolts 90 extending through the cap 68 and cap frame 48, and also extending through the base 56 and threaded into tapped apertures in the thickened rim portion 46 of the base frame 42. In the specific illustrative embodiment of the invention, there are three such bolts, although the invention is not limited to this number. As will be understood, these bolts are of a non-magnetic material, and conveniently are made of brass.

The fixture also includes a magnetic slug 92 fitting within the Teflon sleeve 82. The slug 92 is electrically identical with the slug 32 of the final assembly, and therefore is made of laminated or solid construction in accordance with the construction of the slug 32. The Teflon sleeve 82 is electrically and magnetically equivalent to the air gap in the finished generator, and hence the finished tachometer generator is simulated by the stator assembly sleeve and slug. The slug 92 is provided with a longitudinally extending flat 94 along one side, and at one end is provided with an enlarged head 96 which preferably has its outer circumference knurled for convenience of handling. The slug 92 preferably is provided with a circumferential groove 98 immediately beneath the head 96.

Take-up devices preferably in the form of a pair of bolts 100 are equally arcuately spaced about the cap 68 and cap frame 48. In the present instance, the two bolts are diametrically spaced and are threaded into suitable apertures in the web 50 of the cap frame 48. As will be understood, the Teflon cap 68 is provided with bores coaxial with these threaded apertures to allow the bolt shanks 100 to project beyond the web 50. The bolts 100 pass through a flat bar 102 forming a pressure member engageable with the head 96 of the slug 92.

In carrying out the practice of the invention herein, the outside of the stator is coated at 38 and the inside is coated at 40 with the thermo setting resin or other cementitious material as previously has been described. The slug 92 is assembled with the Teflon sleeve 82, and the Teflon sleeve is inserted through the bore of the stator. The ring or collar 88 then is placed over the lower end of the Teflon sleeve and is moved up against the bottom of the stator laminations 12. The stator and windings then are placed in the base 56 as is illustrated in FIG. 4, and the cap 68 is placed over the top of the stator and windings. The bolts 90 are not at this time tightened, but rather are left loose. The leads 16 are passed out through the holes 72 and 52 and are connected to a suitable source of alternating current potential as is indicated at 104. The leads 18 are passed out through the holes 78 and 54 and are connected to a volt meter 106. Preferably, this volt meter should have the same electrical characteristics as the meter to which the tachometer generator is to be connected in use, but should have a greatly expanded scale. The slug 92 then is turned about its axis to obtain a minimum reading on the volt meter. In addition to this, individual laminations are adjusted in position relative to one another to obtain a minimum reading. This allows skewing of teeth or other local deformations to be compensated for. If one or more laminations are out of adjustment, one or more others can be moved relative to the entire stack to produce a compensating effect. Thus, a lower minimum reading of residual voltage is obtained then can be obtained by adjusting the slug only. This is not to imply that every lamination in a stator must be adjusted to its optimum position. In actual practice, groups of laminations are turned by the fingers to various positions with the fingers placed on the outside surface to obtain a low reading. This is a rapid and very practical production step, and produces a much better coarse adjustment than can be obtained without any such adjustment of the stack of laminations. The final fine adjustment is always completed with slug 92 after the machining of the bore is completed. It will be appreciated that the laminations are provided with a notch 108 (FIG. 1) used in lining up all of the laminations for initial assembly, or for producing a randomized assembly by skewing the notches of successive assemblies, and that this notch in each lamination may prove helpful for cooperation with a pointed instrument in shifting or rotating each lamination. When a minimum reading is obtained in this manner, the screws or bolts 90 are tightened to obtain a minimum reading, and thereafter the screws or bolts 100 are tightened further to obtain a minimum reading. The entire assembly then is cured in an oven for a suitable length of time to polymerize or set the resin or other cementitious material 38 and 40. The stator assembly 10 then can be removed from the fixture or jig, and is ready for further steps, principally assembling with a housing and drag cup.

Balancing out of dissymmetries, principally eccentricity of the lamination center holes, by the rotation of the slug will be obvious. It further has been noted previously that shifting of the individual laminations either laterally or rotationally before clamping helps to balance out skewed teeth and other local deformities. In addition to this, the tightness to which the laminations are clamped at the outer edges and at the center is of importance in eliminating further residual voltage. Reference should be had to FIGS. 7 and 8 for what is thought to be the correct explanation of this further minimizing of residual voltage.

As will be seen in FIG. 7, the laminations 12 often have burrs 108 about the center stator hole by virtue of their stamped construction, and also often have burrs 110 about the outer edges. Accordingly, the flux lines 112 throughout most of the area of the laminations are substantially uniformly distributed, but some of the flux lines 114 at the burrs spread out into the burrs. The limited cross sectional area of the burrs causes them quickly to become saturated as flux is established at the start of a current cycle. Further flux then must pass through the air. It is thought that this change in distribution of flux lines causes many of the higher harmonics of the residual voltage of a tachometer generator. As the laminations are clamped toward one another about their edges by tightening the bolts 90, the burrs 110 are flattened out to some extent, and the distribution of the flux lines 112 and 114 becomes more uniform. The same situation is thought to prevail when the center portions of the laminations are clamped together between the Teflon sleeve head 84 and the ring 88. It might at first be thought that the best results would be obtained simply by clamping the laminations together as tightly as possible, but this has been found not necessarily to be true. As will be seen in FIG. 8, the burrs of one lamination then would tend to dig into the adjacent lamination rather than merely to rest against the surface of the adjacent lamination, and perhaps this adversely affects the flux distribution. The best results are obtained when the peripheral edges of the laminations are clamped together to obtain the lowest reading, even if this is not as tightly clamped together as is possible, followed by clamping together of the laminations adjacent the center hole to obtain a further minimum reading.

Residual voltages have been obtained using the apparatus and method herein described which are far lower than any heretofore known to me. Specifically, the residual voltage is cut down to a very few millivolts, and this leads to a tachometer system of extreme accuracy.

The specific example of the invention herein shown and described is to be understood as being for exemplary purposes only. Various changes in structure will no doubt occur to those skilled in the art, and are to be understood as forming a part of the invention insofar as they fall within the spirit and scope of the appended claims.

The invention is claimed as follows:

1. The method of minimizing residual voltage in tachometer generators which comprises assembling input and output windings with the loosely assembled laminations of a tachometer generator stator, inserting a non-conductive, non-magnetic spacer sleeve into the center hole of the loosely assembled stator laminations, inserting a cylindrical slug having a flat on one side into the spacer sleeve in the stator in spaced relation thereto, applying A.C. voltage to the input winding, measuring the output voltage, rotating the slug to maintain a minimum output voltage, relatively shifting the loosely assembled laminations to obtain a minimum output voltage, and securing the laminations in the position giving the last mentioned output voltage.

2. The method of minimizing residual voltage in tachometer generators which comprises assembling input and output windings with the loosely assembled laminations of a tachometer generator stator, applying a cementitious material to the laminations, applying A.C. voltage to the input winding, measuring the A.C. output voltage of the output winding, relatively shifting at least one of the loosely assembled laminations rotationally relative to others thereof to obtain a minimum output voltage, and subsequently hardening the cementitious material to hold the laminations in the position giving such minimum output voltage.

3. The method of minimizing residual voltage in tachometer generators which comprises assembling input and output windings with the loosely assembled laminations of a tachometer generator stator, applying A.C. voltage to the input winding, measuring the A.C. output voltage of the output winding, relatively shifting at least one of the loosely assembled laminations relative to others thereof to obtain a minimum output voltage, clamping the loosely assembled laminations together to a degree necessary to obtain a further minimum output voltage, and securing the laminations in the position giving such further minimum output voltage.

4. The method of minimizing residual voltage in tachometer generators as set forth in claim 3 wherein the clamping step comprises clamping the laminations together about their peripheries.

5. The method of minimizing residual voltage in tachometer generators as set forth in claim 4 and wherein the clamping step further comprises clamping the laminations together adjacent the center hole of the stator.

6. The method of minimizing residual voltage in tachometer generators which comprises assembling input and output windings with the loosely assembled laminations of a tachometer generator stator inserting an insulating magnetic spacer sleeve in the bore in said stator, inserting a generally cylindrical slug having a flat thereon into said spacer sleeve in the bore of said stator, applying an A.C. voltage to the input winding, measuring the output voltage of the output winding, rotating said slug to obtain a first minimum output voltage, relatively shifting at least one of the loosely assembled laminations relative to others thereof to obtain a second minimum output voltage, clamping the laminations together about the peripheries thereof to obtain a further minimum output voltage, clamping the laminations together adjacent the bore of the stator to obtain another minimum output voltage, and securing the laminations in the position giving the last mentioned minimum output voltage.

References Cited in the file of this patent

UNITED STATES PATENTS

| | | |
|---|---|---|
| 659,716 | Thomson | Oct. 16, 1900 |
| 2,327,352 | Hoover | Aug. 24, 1943 |
| 2,342,392 | Evans | Feb. 22, 1944 |
| 2,378,014 | Horni | June 12, 1945 |
| 2,469,100 | Andrus | May 3, 1949 |
| 2,500,730 | Yonkers | Mar. 14, 1950 |
| 2,680,285 | Furnas | June 8, 1954 |
| 2,734,140 | Parker | Feb. 7, 1956 |
| 2,738,433 | Schroeder et al. | Mar. 13, 1956 |
| 2,832,908 | Abbott | Apr. 9, 1958 |
| 2,842,834 | Macchione | July 15, 1958 |
| 2,898,486 | Sheldon | Aug. 4, 1959 |